United States Patent [19]
Tsao

[11] Patent Number: 5,967,787
[45] Date of Patent: Oct. 19, 1999

[54] EDUCATIONAL DISPLAY WITH A CLOCK AND WITH NUMERAL AND DATE BLOCKS ACCOMPANIED BY A BASE 10 MATHEMATICAL APPARATUS

[76] Inventor: Chin-Chen Tsao, No. 152, Tung Pei Street, Chung Shan District, Taipei City, Taiwan

[21] Appl. No.: 09/007,016

[22] Filed: Jan. 14, 1998

[51] Int. Cl.⁶ .................................................. G09B 1/00
[52] U.S. Cl. ..................... 434/208; 434/403; 434/429; 434/188
[58] Field of Search ..................................... 434/403, 393, 434/429, 208, 188; 40/358, 109, 107; 968/139; 368/28

[56] References Cited

U.S. PATENT DOCUMENTS

| | | | |
|---|---|---|---|
| D. 190,492 | 6/1961 | Eickmeyer et al. | D25/1 |
| D. 203,176 | 12/1965 | Kardach | 434/208 |
| 2,804,699 | 12/1953 | Robinson | 434/208 |
| 3,564,741 | 2/1971 | Kahre et al. | 40/107 |
| 3,670,436 | 6/1972 | Weissman | 40/107 |
| 3,755,924 | 9/1973 | Langieri, Jr. et al. | 434/208 |
| 3,829,996 | 8/1974 | Buschman | 40/28 |
| 4,331,424 | 5/1982 | Crane | 434/208 |
| 4,472,892 | 9/1984 | Yang | 40/107 |
| 5,297,965 | 3/1994 | Manancero | 434/195 |
| 5,537,369 | 7/1996 | Wu | 368/10 |
| 5,683,252 | 11/1997 | Tsao | 434/195 |

*Primary Examiner*—Jessica J. Harrison
*Assistant Examiner*—David A. Fleming
*Attorney, Agent, or Firm*—Pro-Techtor International Services

[57] ABSTRACT

The invention herein relates to a kind of teaching tool that allows children at play to perform simple addition, subtraction, multiplication and division arithmetical operations, learning decimal concepts and practices through experience and, furthermore, learn about year, month, day and day of the week as well as the hour, minute and second clock positions, which enables the invention herein to be an multi-functional teaching tool that combines fun with learning and the promotion of intellectual development.

1 Claim, 31 Drawing Sheets

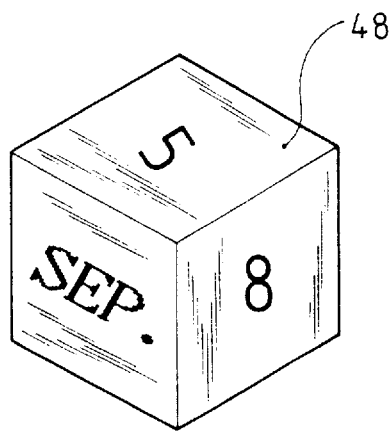
F I G . 20
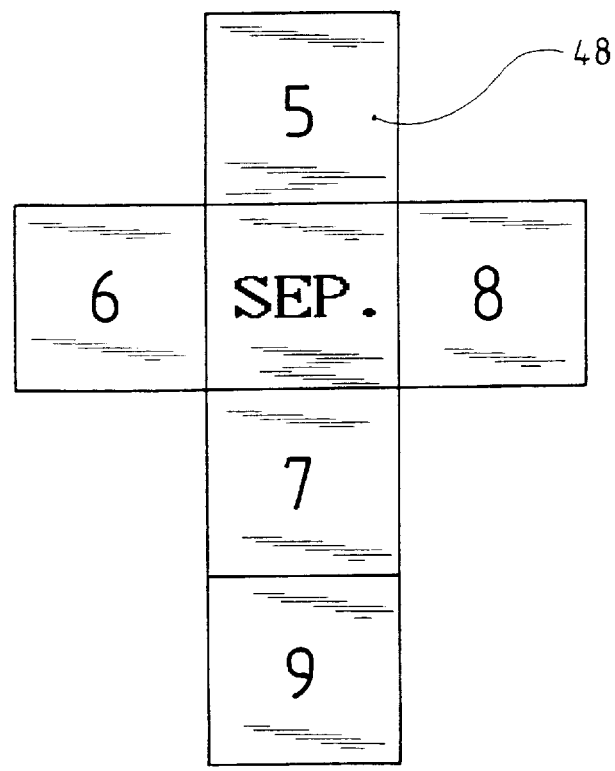
F I G . 21

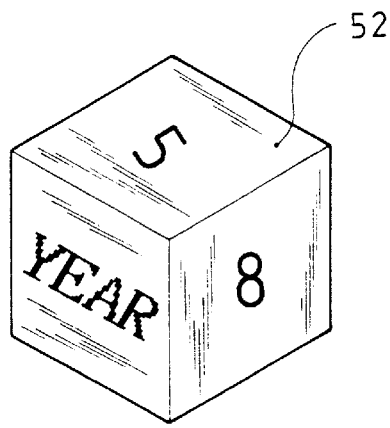
F I G . 28
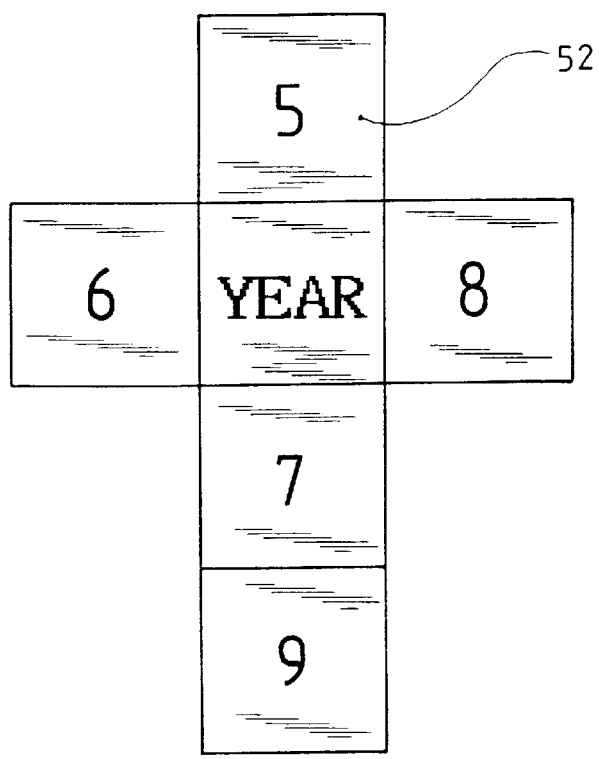
F I G . 29

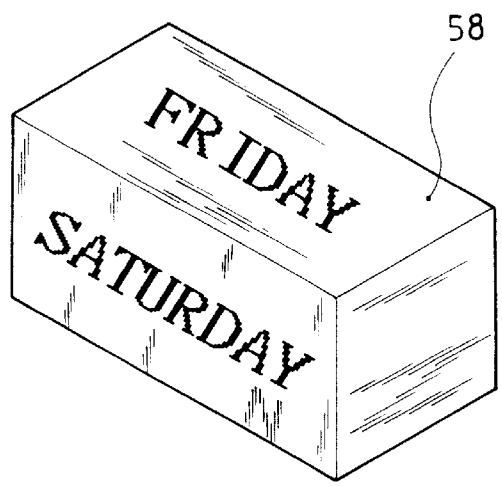
F I G . 40
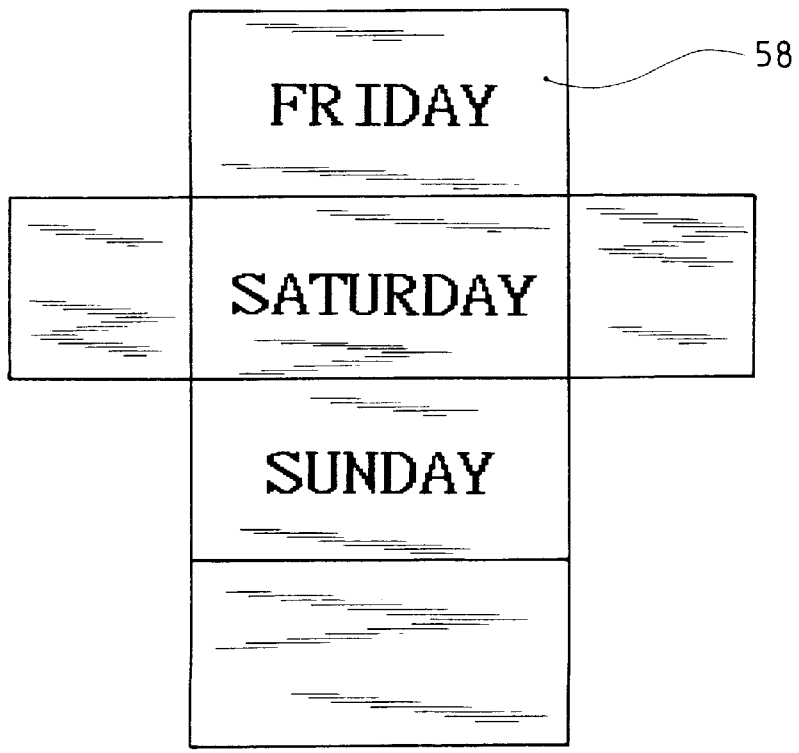
F I G . 41

EDUCATIONAL DISPLAY WITH A CLOCK AND WITH NUMERAL AND DATE BLOCKS ACCOMPANIED BY A BASE 10 MATHEMATICAL APPARATUS

SCOPE OF THE INVENTION

The invention herein relates to a kind of teaching tool that allows children at play to perform simple addition, subtraction, multiplication and division arithmetical operations, learn decimal concepts and practices through experience and, furthermore, learn about year, month, day and day of the week as well as the hour, minute and second positions of the clock, which enables the invention herein to be an multi-functional teaching tool that combines fun with learning and the promotion of intellectual development.

BACKGROUND OF THE INVENTION

Conventional children's toys only offer a single assembly, arrangement or colorful effect to effectively attract youngsters. Such toys only provide children one interesting aspect. Since ancient times, man has had an instinct to learn and survive, and to remain vigilant and responsive to unfamiliar things. Mankind's instinctive response is especially evident in children of young age; when children are happily and deeply engaged in learning through imitation, providing a suitable tool effectively allows the mind of the child to be continually stimulated and educated during ordinary daily play. Most people are aware that most conventional toys are incapable of increasing knowledge while children are playing. As a result, how to fabricate a toy of simple and effective structure that is interesting to children while also promoting their intellectual development has long been a topic of discussion among parents and teachers. In view of the conventional toys that are not satisfactory educationally to parents, the inventor of the invention herein has engaged in research, experimentation, improvement and finally developed a kind teaching tool that genuinely improves upon the non-educational nature of conventional toys.

SUMMARY OF THE INVENTION

The primary objective of the invention herein is to provide a kind of teaching tool that utilizes square blocks that are arranged to perform simple arithmetical addition, subtraction, multiplication and division calculations and which permits the learning and practice of decimal principles and, furthermore, the hour, minutes and second positions of the clock in an enlightening manner that effectively promotes teaching and learning.

To enable the examination committee to further understand the innovations and advantages of the invention herein, the detailed description of the embodiment of the invention herein are accompanied by the brief description of the drawings below.

BRIEF DESCRIPTION OF THE DRAWINGS

FIG. 20 is an isometric structural drawing of the square block (48) of the invention herein.

FIG. 21 is an orthographic drawing of the alphanumeric character markings on the six surfaces of the square block (48) of the invention herein.

FIG. 28 is an isometric structural drawing of the square block (52) of the invention herein.

FIG. 29 is an orthographic drawing of the alphanumeric character markings on the six surfaces of the square block (52) of the invention herein.

FIG. 40 is an isometric structural drawing of the rectangular block (58) of the invention herein.

FIG. 41 is an orthographic drawing of the alphanumeric character markings on the six surfaces of the rectangular block (58) of the invention herein.

PARTS OF THE DRAWINGS

| (1) Teaching tool. | (11) Square block. |
| (12) Base. | (13) Slanted layout box. |
| (14) Channel. | (15) Channel. |
| (16) Channel. | (17) Channel. |
| (18) Clock. | (2) Layout box. |
| (21) Left channel. | (22) Right channel. |
| (23) Extended stop block. | (3) Layout box. |
| (31) Container box. | (32) Recess |
| (33) Lock pin. | (34) Stop cover. |
| (35) Elongated hole. | (36) Face plate. |
| (37) Open-ended slot holes. | (40) Square block. |
| (41) Square block. | (42) Square block. |
| (43) Square block. | (44) Square block. |
| (45) Square block. | (46) Square block. |
| (47) Square block. | (48) Square block. |
| (49) Square block. | (50) Square block. |

-continued

PARTS OF THE DRAWINGS

| (51) Square block. | (52) Square block. |
| (53) Square block. | (54) Square block. |
| (55) Square block. | (56) Square block. |
| (57) Rectangular block. | (58) Rectangular block. |

DETAILED DESCRIPTION OF THE INVENTION

Figure 1:
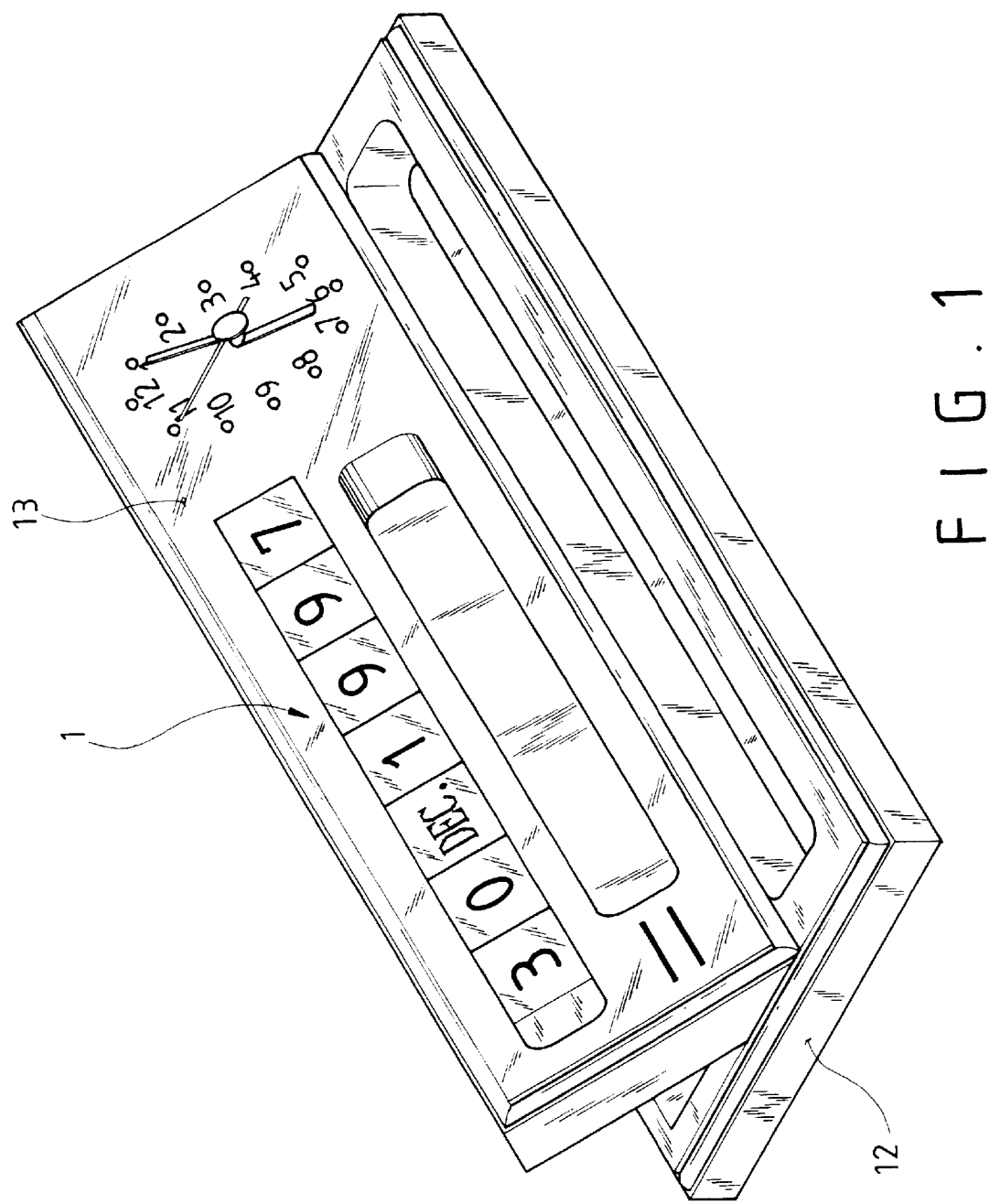
FIG. 1 is an isometric assembly drawing of the invention herein.
Figure 2:
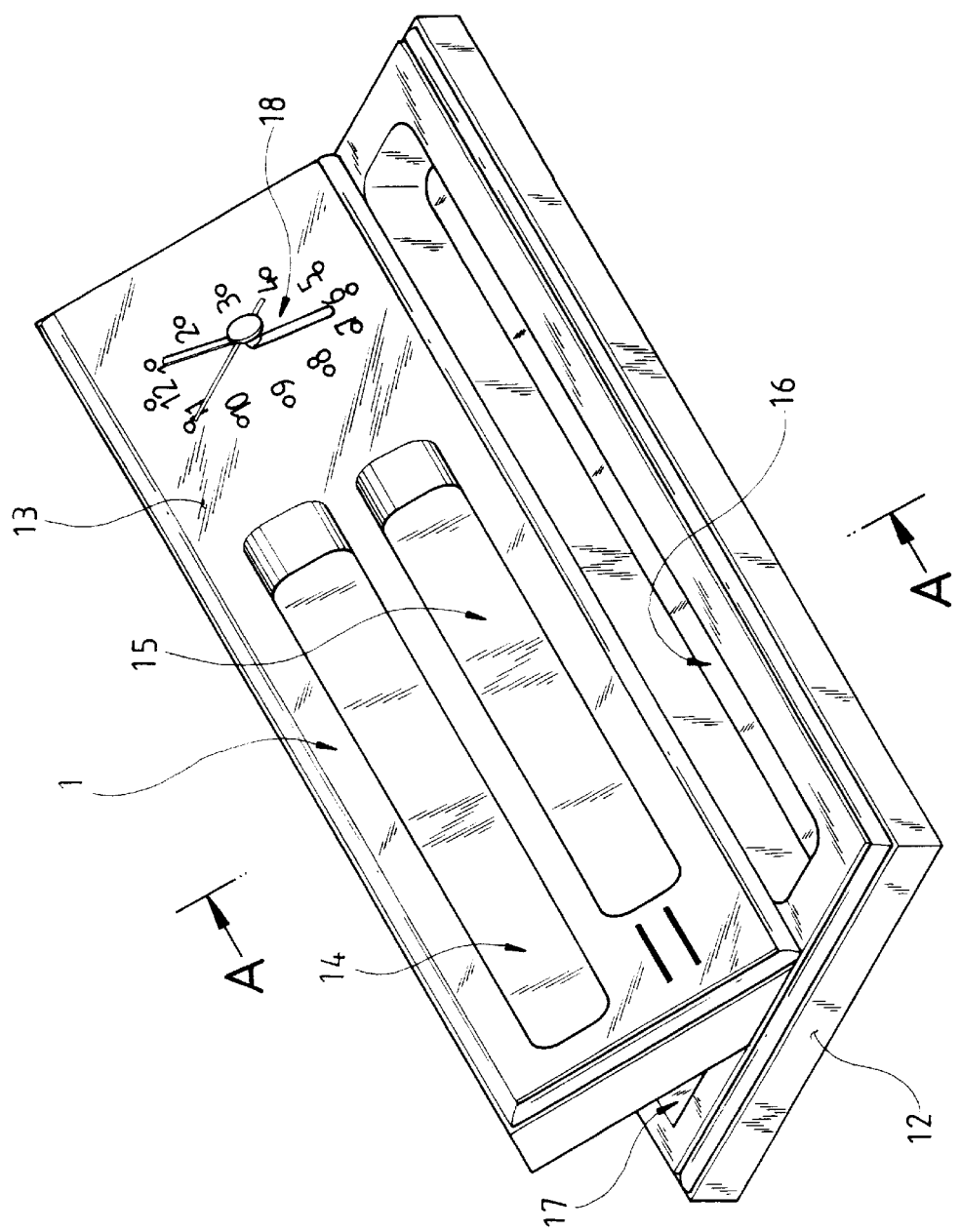
FIG. 2 is an isometric structural drawing of the teaching tool (1) invention herein.
Figure 3:
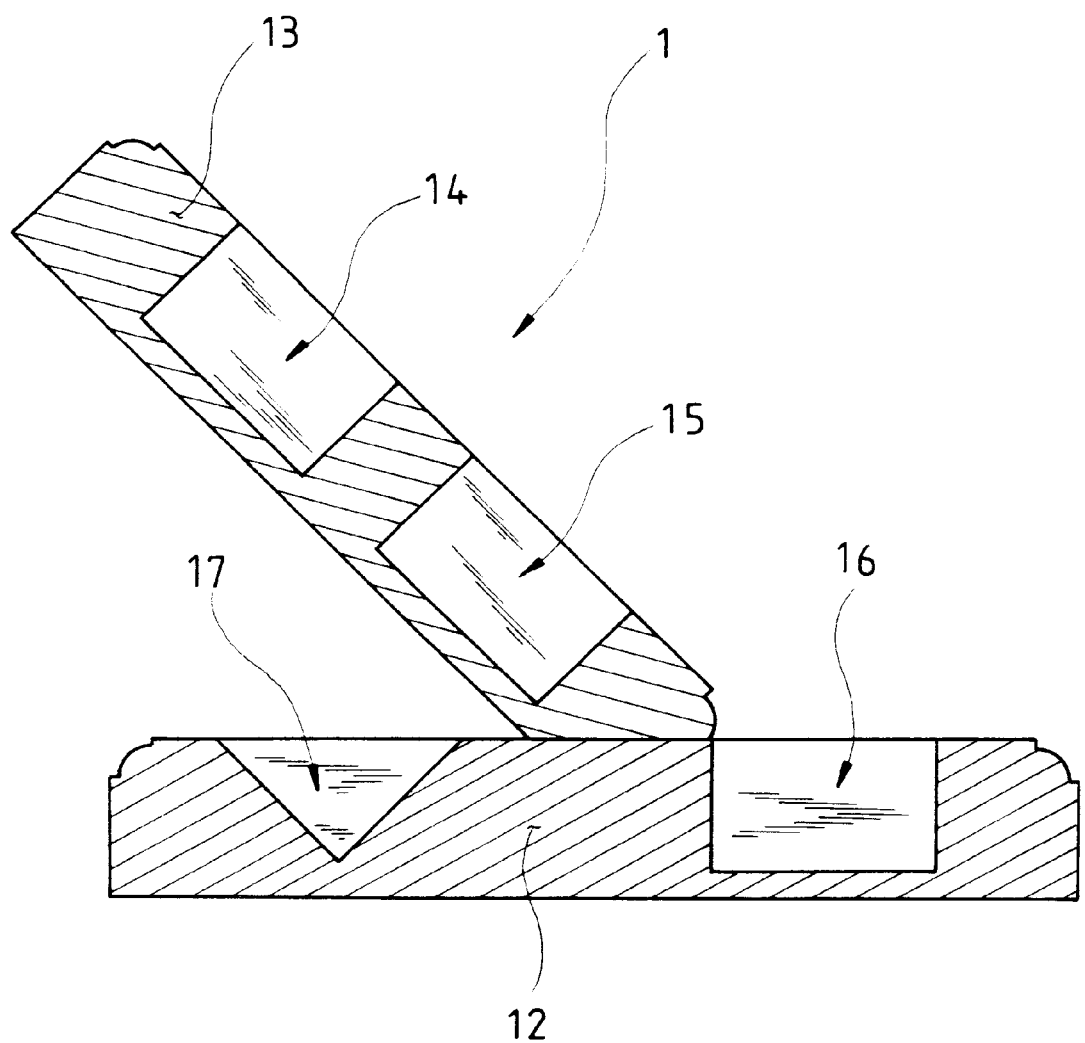
FIG. 3 is a cross-sectional drawing of the invention herein as viewed from the perspective of line A—A in FIG. 2.

Referring to FIG. 1, the invention herein provides a kind of teaching tool that consists of square blocks which can be arrayed together to practice year, month, day, week, hours, minutes, seconds and other related transpositions and is mainly comprised of: a teaching tool (1), a square block (11), the layout boxes (2) and (3), the square blocks (40), (41), (42), (43), (44), (45), (46), (47), (48), (49), (50), (51), (52), (53), (54), (55) and (56), and the rectangular blocks (57) and (58), wherein the teaching tool (1) (referring to FIG. 2 and FIG. 3) has a base layout panel (12) on the bottom section and a slanted layout panel (13) attached along the center and inclined towards the rear of the aforesaid base layout panel (12), and there are two rectangular channels (14) and (15) recessed in the aforesaid slanted layout panel (13), with the symbol "=" marked on the left side of the channel (15); furthermore, there is a clock (18) having an hours hand, a minutes hand and a seconds hand on one side of the aforesaid slanted layout panel (13); and, furthermore, the aforesaid base layout panel (12) has a rectangular channel (16) recessed in the front edge and a triangular channel (17) recessed in the rear edge.

Figure 4:
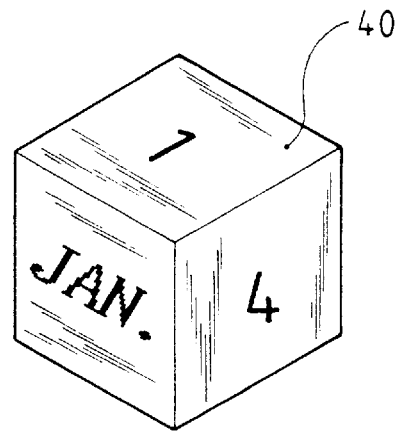
FIG. 4 is an isometric structural drawing of the square block (40) of the invention herein.
Figure 5:
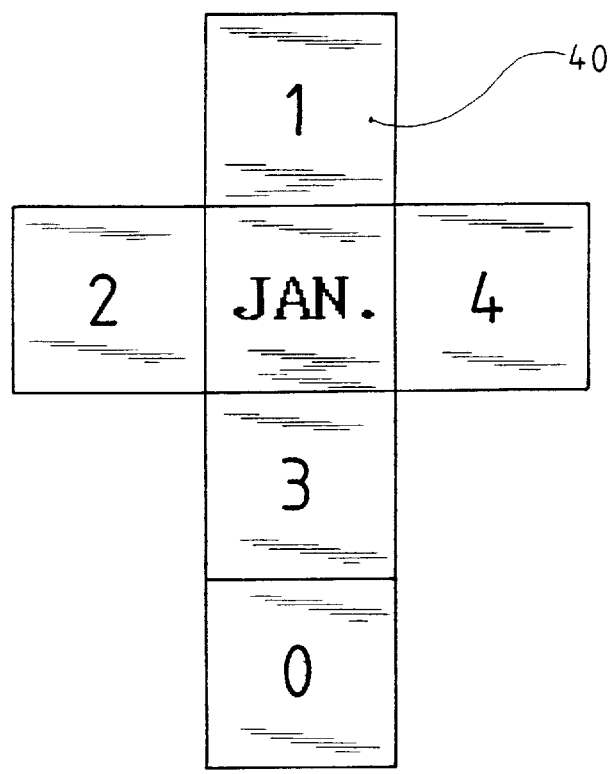
FIG. 5 is an orthographic drawing of the alphanumeric character markings on the six surfaces of the square block (40) of the invention herein.

As indicated in FIG. 4 and FIG. 5, the square block (40) has alphanumeric characters "1, 2, 3, 4, JAN." and "0" respectively printed on the six sides.

Figure 6:
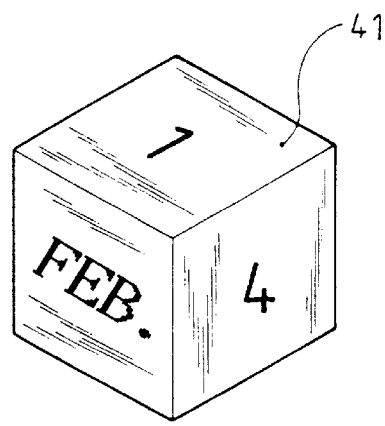
FIG. 6 is an isometric structural drawing of the square block (41) of the invention herein.
Figure 7:
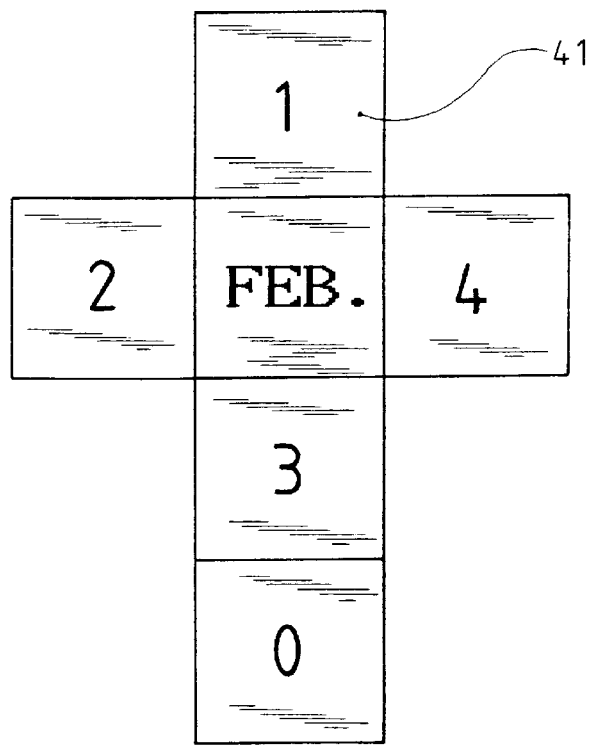
FIG. 7 is an orthographic drawing of the alphanumeric character markings on the six surfaces of the square block (41) of the invention herein.

As indicated in FIG. 6 and 7, the square block (41) has the alphanumeric characters "1, 2, 3, 4, FEB." and "0" respectively printed on the six sides.

Figure 8:
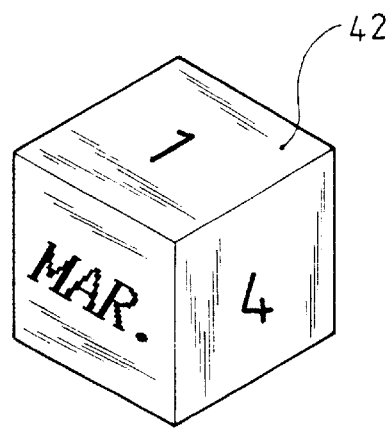
FIG. 8 is an isometric structural drawing of the square block (42) of the invention herein.
Figure 9:
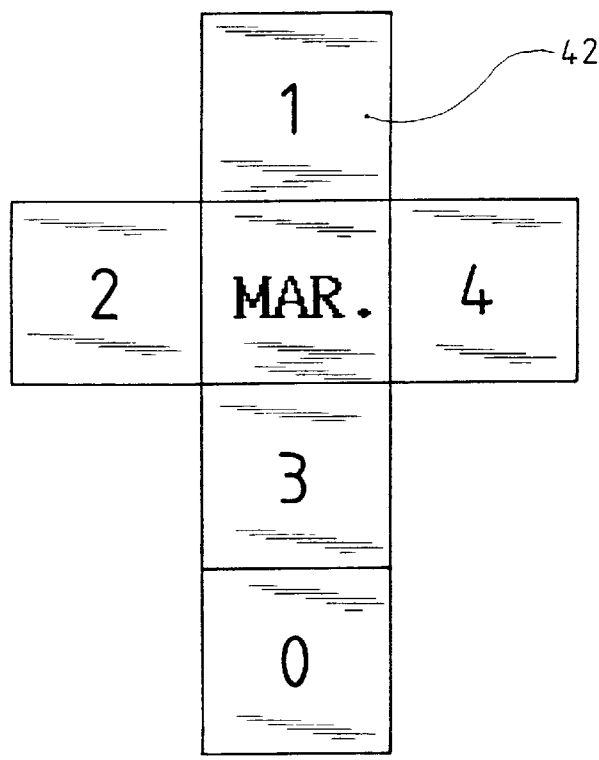
FIG. 9 is an orthographic drawing of the alphanumeric character markings on the six surfaces of the square block (42) of the invention herein.

As indicated in FIG. 8 and FIG. 9, the square block (42) has the alphanumeric characters "1, 2, 3, 4, MAR." and "0" respectively printed on the six sides.

Figure 10:
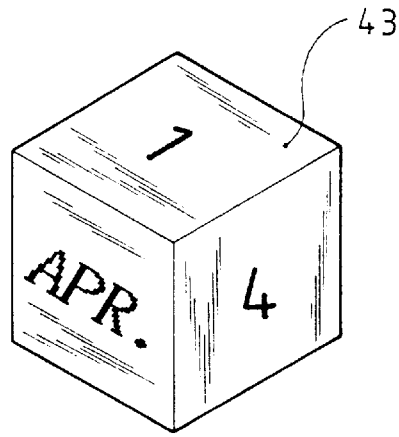
FIG. 10 is an isometric structural drawing of the square block (43) of the invention herein.
Figure 11:
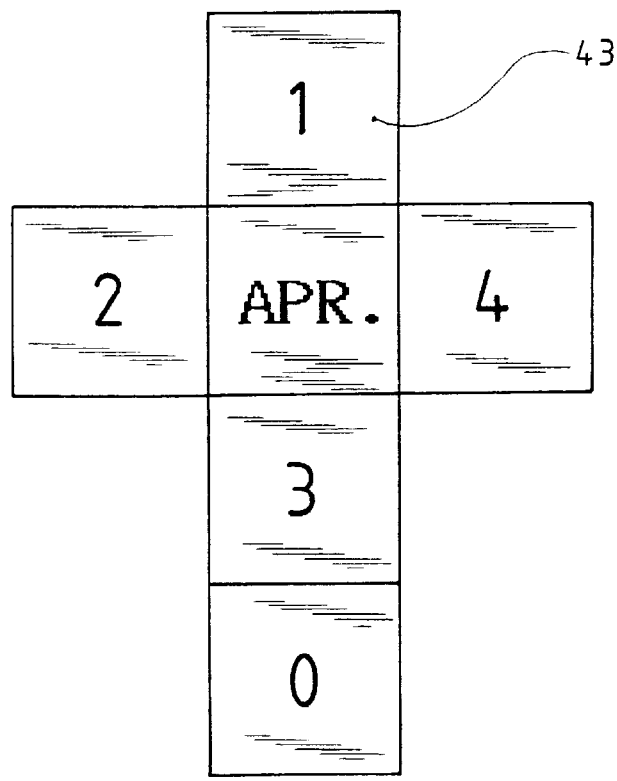
FIG. 11 is an orthographic drawing of the alphanumeric character markings on the six surfaces of the square block (43) of the invention herein.

As indicated in FIG. 10 and FIG. 11, the square block (43) has the alphanumeric characters "1, 2, 3, 4, APR" and "0" respectively printed on the six sides.

Figure 12:
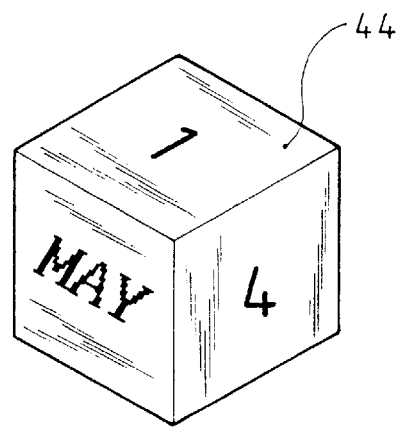
FIG. 12 is an isometric structural drawing of the square block (44) of the invention herein.
Figure 13:
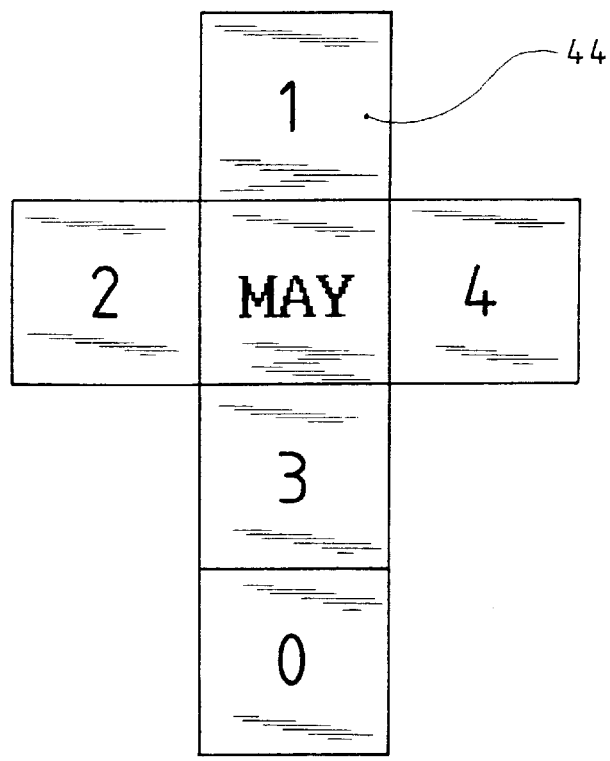
FIG. 13 is an orthographic drawing of the alphanumeric character markings on the six surfaces of the square block (44) of the invention herein.

As indicated in FIG. 12 and FIG. 13, the square block (44) has the alphanumeric characters "1, 2, 3, 4, MAY" and "0" respectively printed on the six sides.

Figure 14:
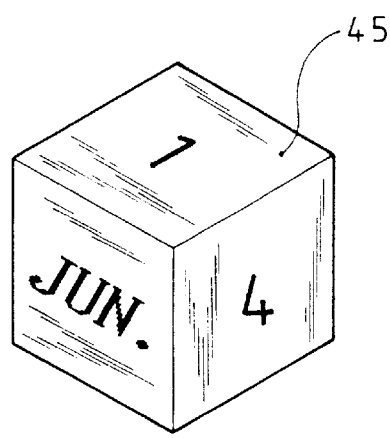
FIG. 14 is an isometric structural drawing of the square block (45) of the invention herein.
Figure 15:
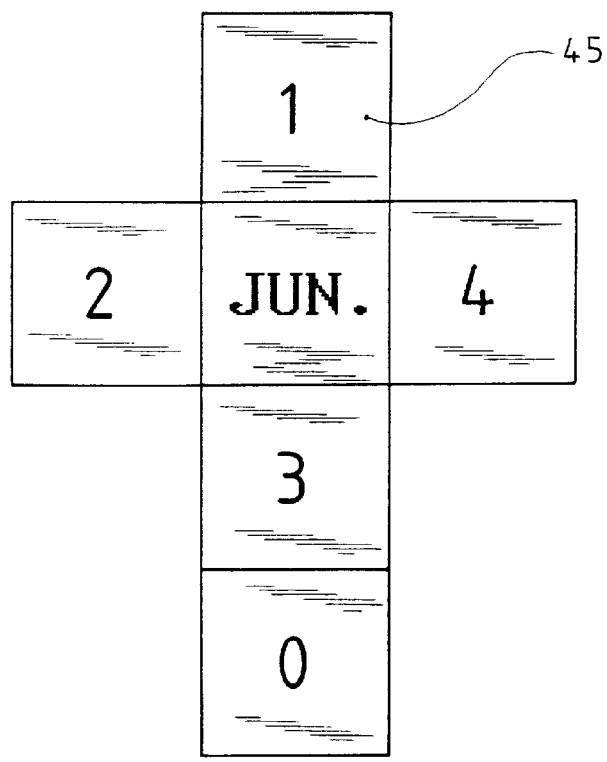
FIG. 15 is an orthographic drawing of the alphanumeric character markings on the six surfaces of the square block (45) of the invention herein.

As indicated in FIG. 14 and FIG. 15, the square block (45) has the alphanumeric characters "1, 2, 3, 4, JUN." and "0" respectively printed on the six sides.

Figure 16:
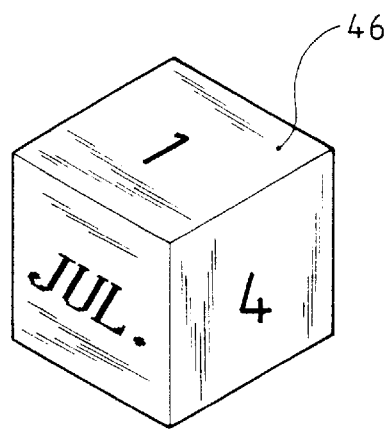
FIG. 16 is an isometric structural drawing of the square block (46) of the invention herein.
Figure 17:
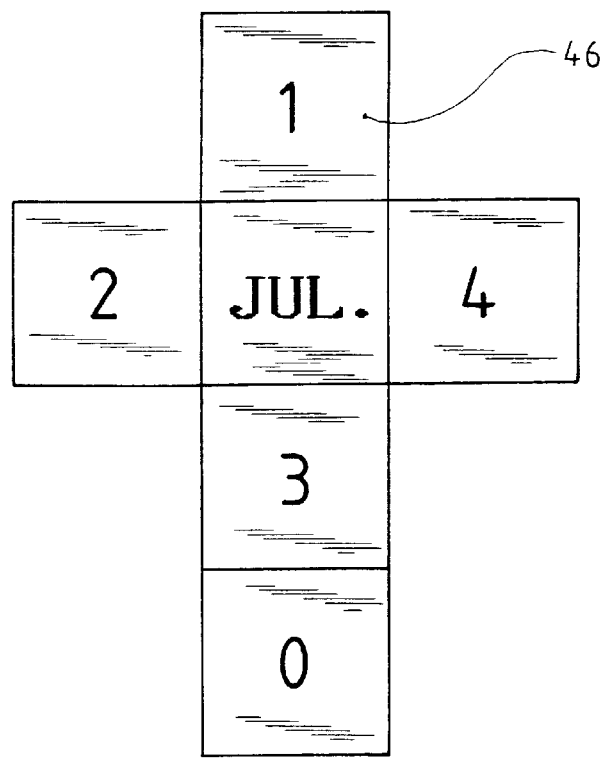
FIG. 17 is an orthographic drawing of the alphanumeric character markings on the six surfaces of the square block (46) of the invention herein.

As indicated in FIG. 16 and FIG. 17, the square block (46) has the alphanumeric characters "1, 2, 3, 4, JUL." and "0" respectively printed on the six sides.

Figure 18:
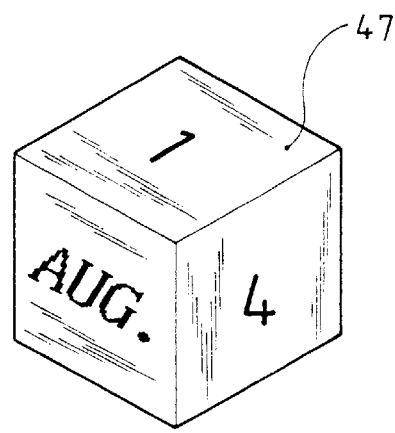
FIG. 18 is an isometric structural drawing of the square block (47) of the invention herein.
Figure 19:
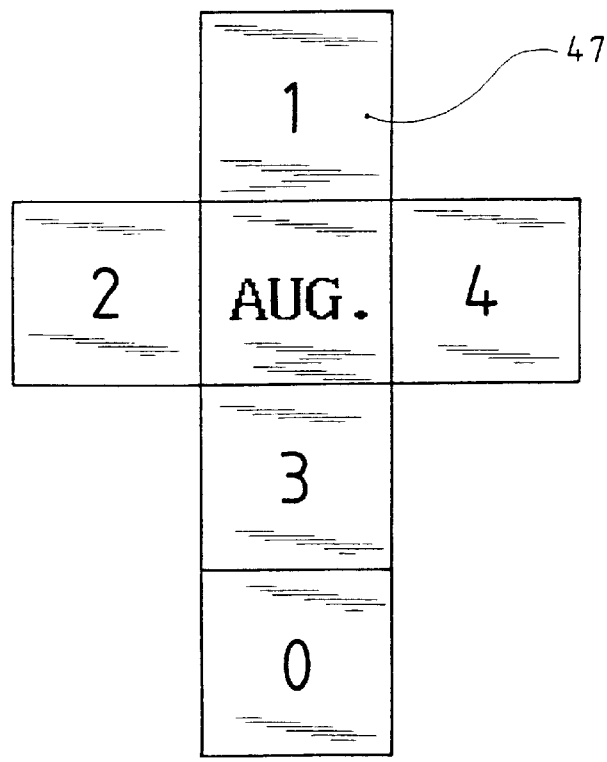
FIG. 19 is an orthographic drawing of the alphanumeric character markings on the six surfaces of the square block (47) of the invention herein.

As indicated in FIG. 18 and FIG. 19, the square block (47) has the alphanumeric characters "1, 2, 3, 4, AUG." and "0" respectively printed on the six sides.

As indicated in FIG. 20 and FIG. 21, the square block (48) has the alphanumeric characters "5, 6, 7, 8, SEP." and "9" respectively printed on the six sides.

Figure 22:
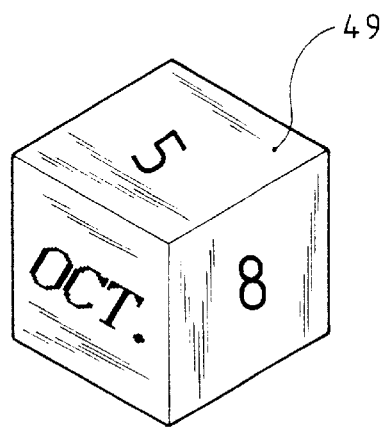
FIG. 22 is an isometric structural drawing of the square block (49) of the invention herein.
Figure 23:
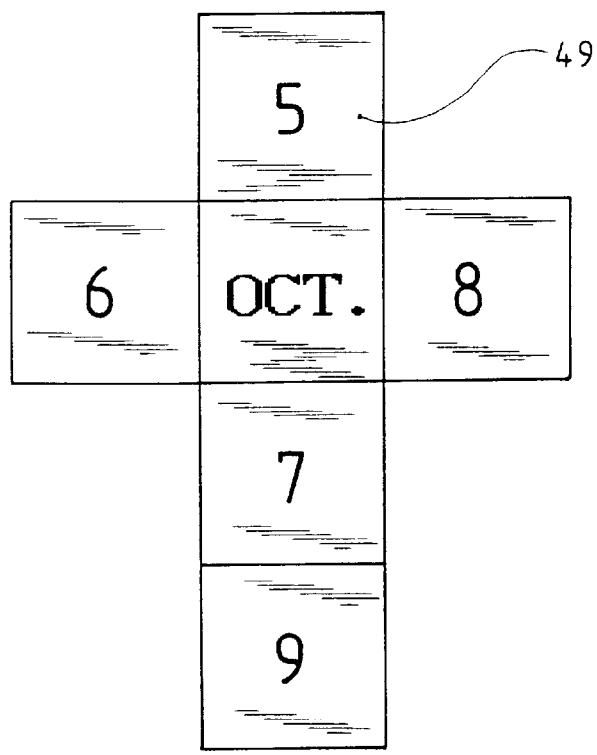
FIG. 23 is an orthographic drawing of the alphanumeric character markings on the six surfaces of the square block (49) of the invention herein.

As indicated in FIG. 22 and FIG. 23, the square block (49) has a the alphanumeric characters "5, 6, 7, 8, OCT." and "9" respectively printed on the six sides.

Figure 24:
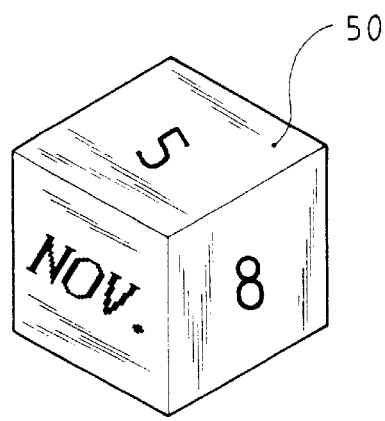
FIG. 24 is an isometric structural drawing of the square block (50) of the invention herein.
Figure 25:
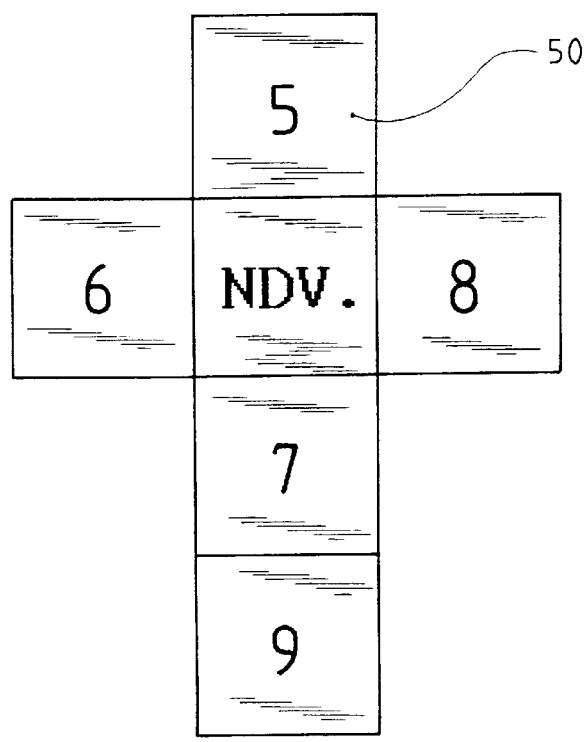
FIG. 25 is an orthographic drawing of the alphanumeric character markings on the six surfaces of the square block (50) of the invention herein.

As indicated in FIG. 24 and FIG. 25, the square block (50) has the alphanumeric characters "5, 6, 7, 8, NOV." and "9" respectively printed on the six sides.

Figure 26:
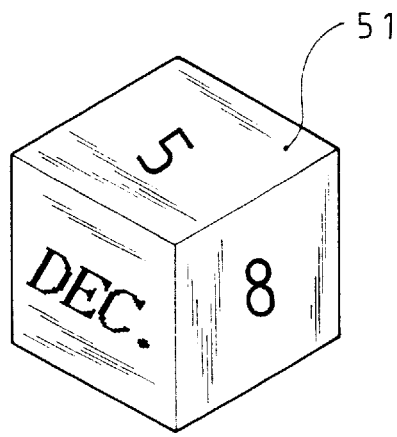
FIG. 26 is an isometric structural drawing of the square block (51) of the invention herein.
Figure 27:
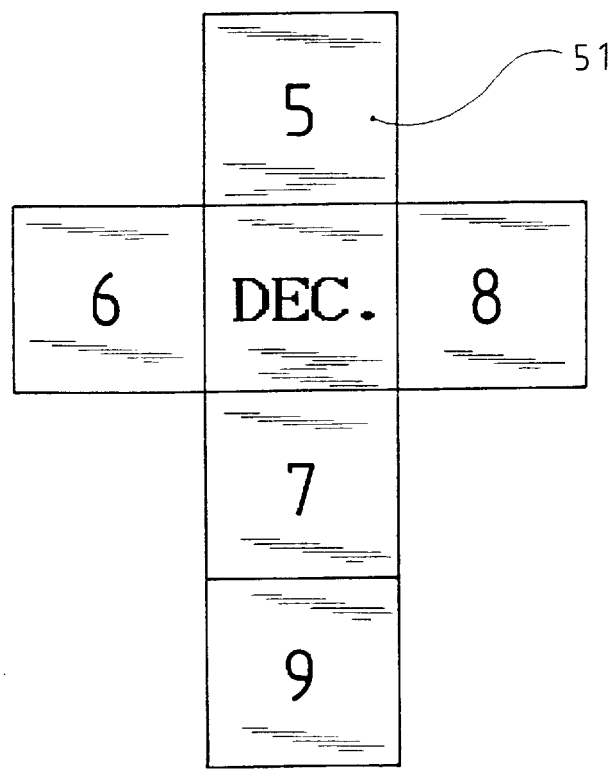
FIG. 27 is an orthographic drawing of the alphanumeric character markings on the six surfaces of the square block (51) of the invention herein.

As indicated in FIG. 26 and FIG. 27, the square block (51) has the alphanumeric characters "5, 6, 7, 8, DEC." and "9" respectively printed on the six sides.

As indicated in FIG. 28 and FIG. 29, the square block (52) has the alphanumeric characters "5, 6, 7, 8, YEAR" and "9" respectively printed on the six sides.

Figure 30:
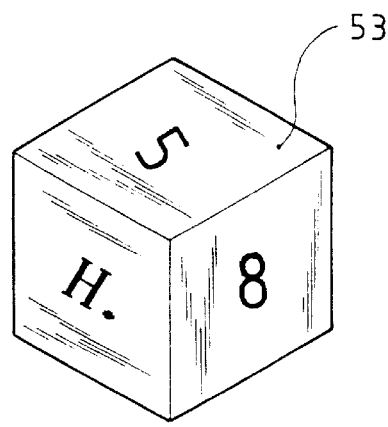
FIG. 30 is an isometric structural drawing of the square block (53) of the invention herein.
Figure 31:
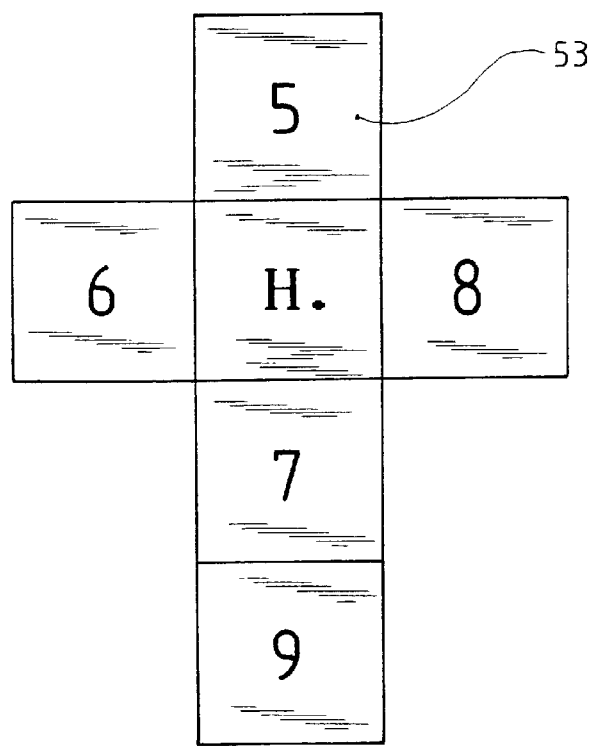
FIG. 31 is an orthographic drawing of the alphanumeric character markings on the six surfaces of the square block (53) of the invention herein.

As indicated in FIG. 30 and FIG. 31, the square block (53) has the alphanumeric characters "5, 6, 7, 8, H." and "9" respectively printed on the six sides.

Figure 32:
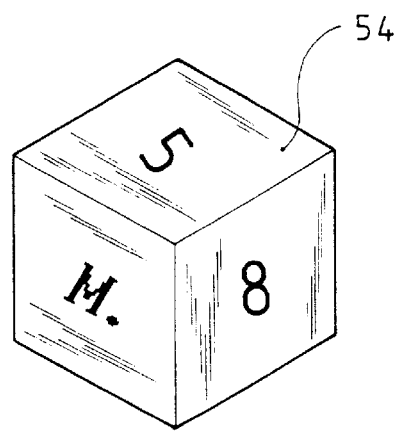
FIG. 32 is an isometric structural drawing of the square block (54) of the invention herein.
Figure 33:
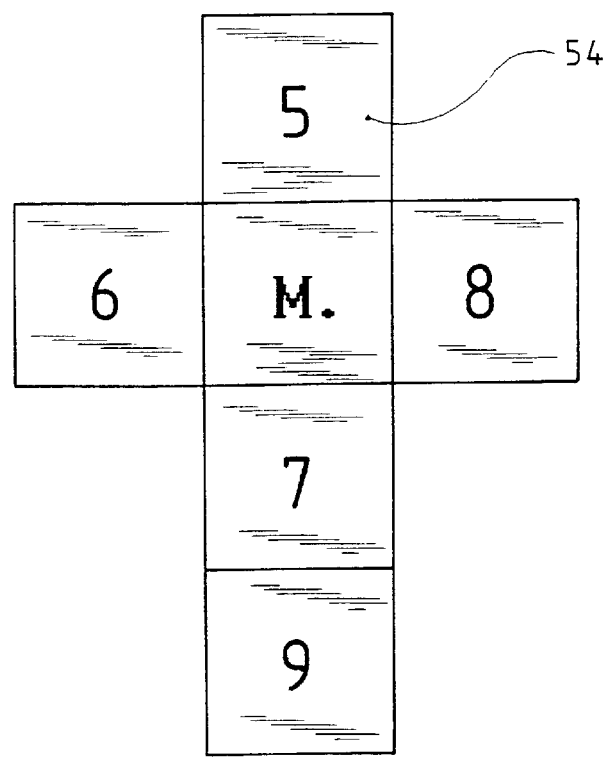
FIG. 33 is an orthographic drawing of the alphanumeric character markings on the six surfaces of the square block (54) of the invention herein.

As indicated in FIG. 32 and FIG. 33, the square block (54) has the alphanumeric characters "5, 6, 7, 8, M." and "9" respectively printed on the six sides.

Figure 34:
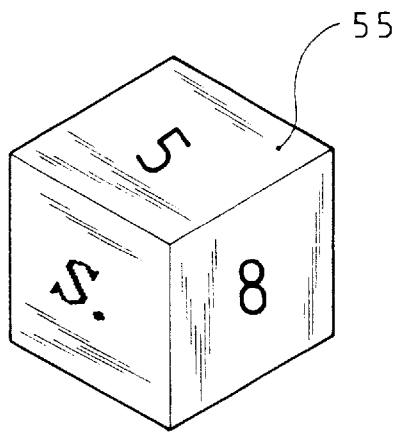
FIG. 34 is an isometric structural drawing of the square block (55) of the invention herein.
Figure 35:
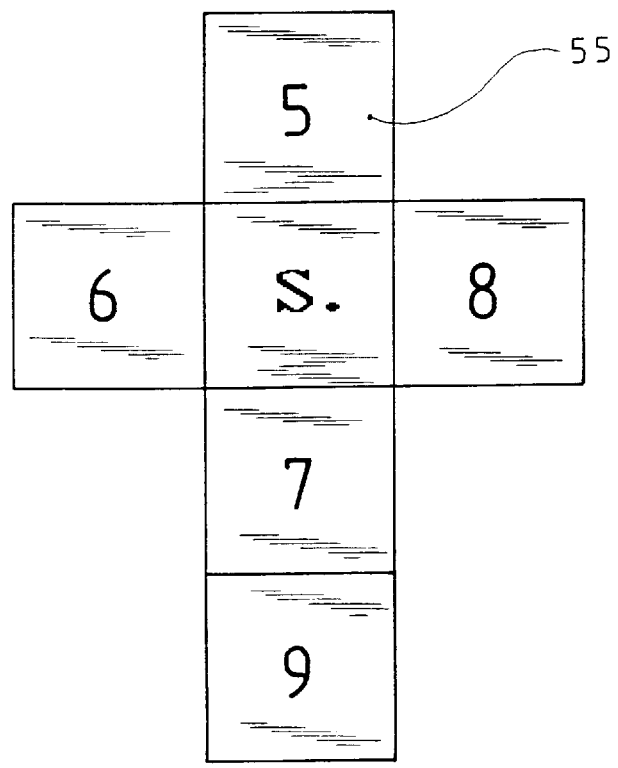
FIG. 35 is an orthographic drawing of the alphanumeric character markings on the six surfaces of the square block (55) of the invention herein.

As indicated in FIG. 34 and FIG. 35, the square block (55) has the alphanumeric characters "5, 6, 7, 8, S." and "9" respectively printed on the six sides.

Figure 36:
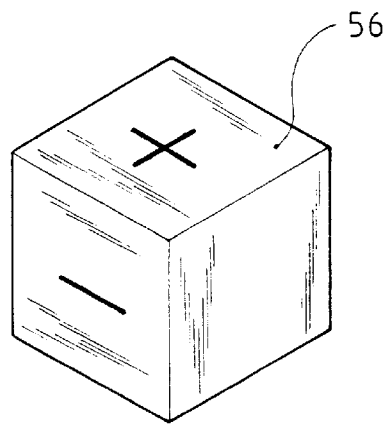
FIG. 36 is an isometric structural drawing of the square block (56) of the invention herein.
Figure 37:
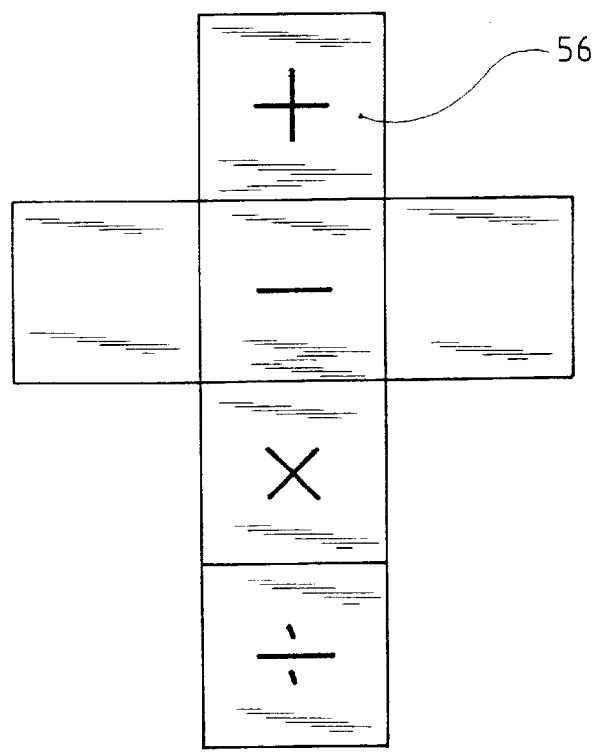
FIG. 37 is an orthographic drawing of the alphanumeric character markings on the six surfaces of the square block (56) of the invention herein.

As indicated in FIG. 36 and FIG. 37, the square block (56) has the symbols "+,−,×." and "÷" respectively printed on the six sides.

Figure 38:
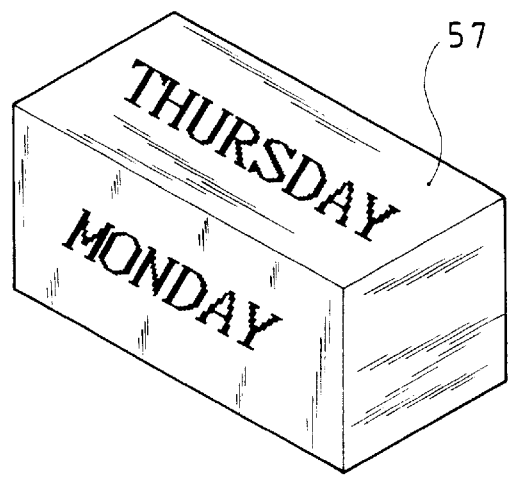
FIG. 38 is an isometric structural drawing of the rectangular block (57) of the invention herein.
Figure 39:
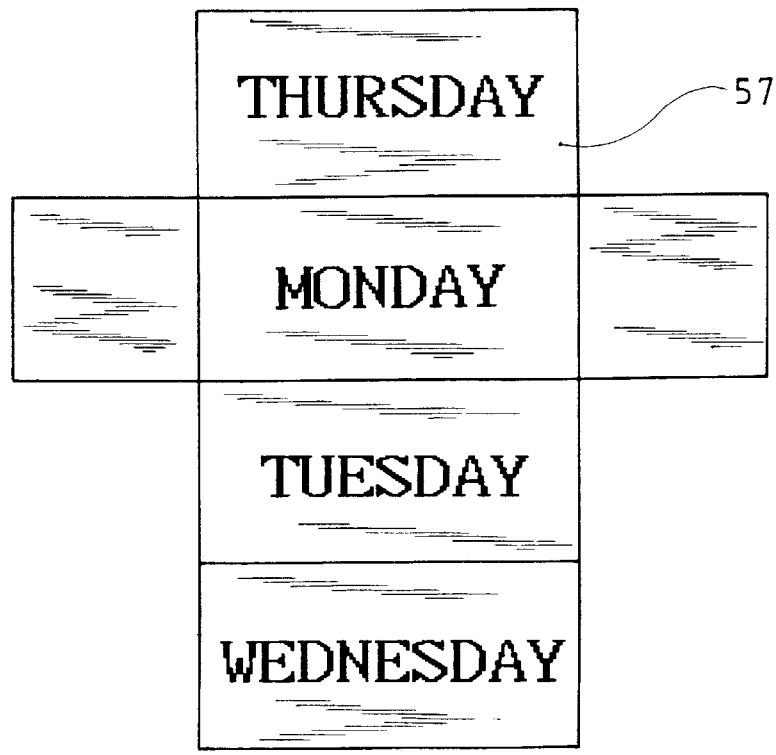
FIG. 39 is an orthographic drawing of the alphanumeric character markings on the six surfaces of the rectangular block (57) of the invention herein.

As indicated in FIG. 38 and FIG. 39, the rectangular block (57) has the words "THURSDAY, MONDAY, TUESDAY, WEDNESDAY" and "THURSDAY" respectively printed on four sides.

As indicated in FIG. 40 and FIG. 41, the rectangular block (58) has the words "FRIDAY, SATURDAY" and "SUNDAY" respectively printed on three sides.

Figure 42:
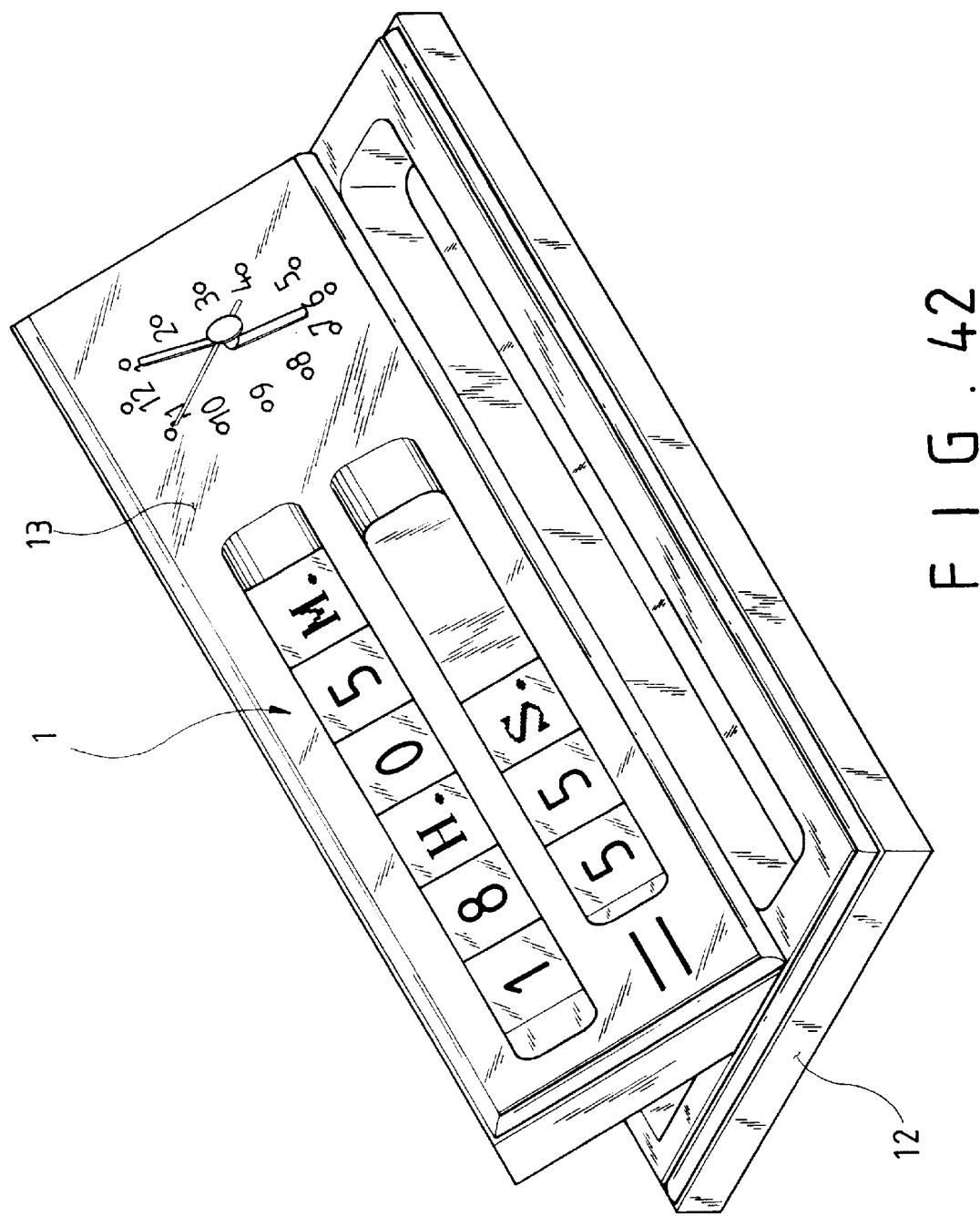
FIG. 42 is an another embodiment of the invention herein.
Figure 43:
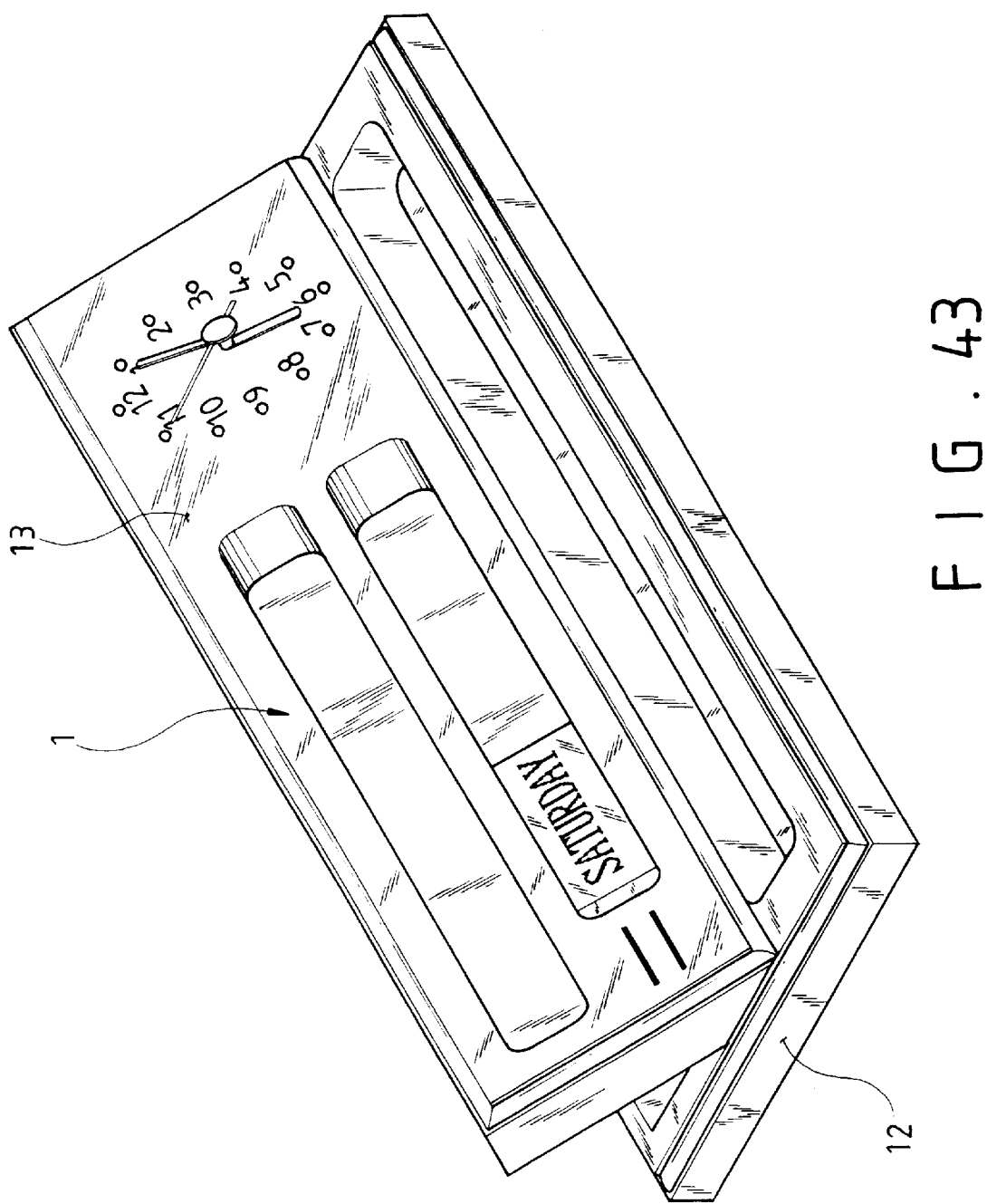
FIG. 43 is a yet another embodiment of the invention herein.
Figure 44:
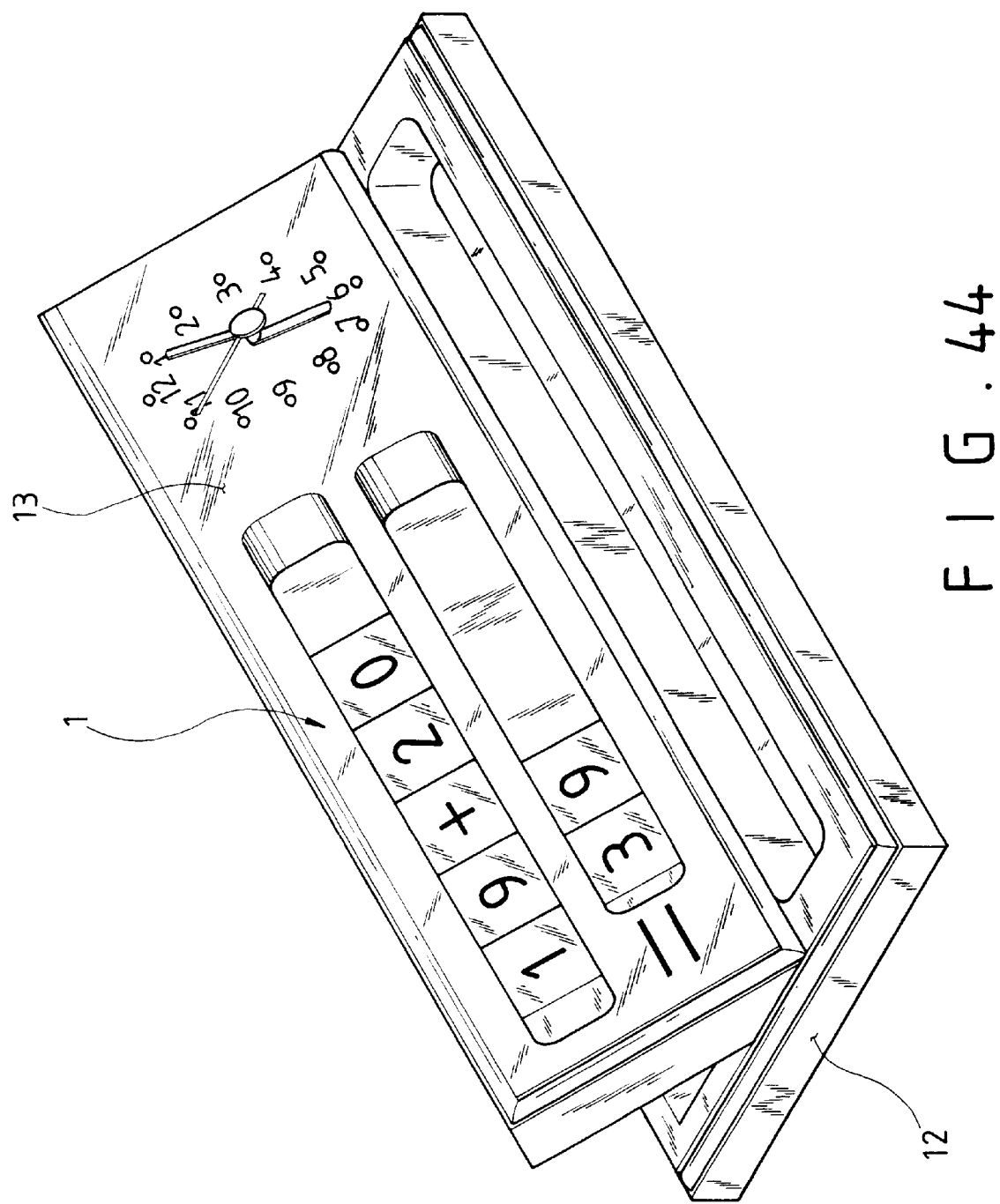
FIG. 44 is a further embodiment of the invention herein.

The aforesaid square blocks (40), (41), (42), (43), (44), (45), (46), (47), (48), (49), (50), (51), (52), (53), (54), (55) and (56) of the invention herein can be arranged, as indicated in FIG. 1, to display the date "30 DEC. 1997"; the square blocks (40), (41), (42), (43), (44), (45), (46), (47), (48), (49), (50), (51), (52), (53), (54), (55) and (56) can also be arranged, as indicated in FIG. 42, to display the time "18H.05M.55S." to provide children a means of learning the corresponding position of the hour, minute and second hands; furthermore, the rectangular blocks (57) and (58) can be arranged, as indicated in FIG. 43, to display the day of the week "SATURDAY," and when not utilized, the square blocks (40), (41), (42), (43), (44), (45), (46), (47), (48), (49), (50), (51), (52), (53), (54), (55) and (56) along with the rectangular blocks (57) and (58) can be temporarily placed into the rectangular channel or the triangular channel (16) of the base layout panel (12); furthermore, the alphanumeric characters printed on the aforesaid square blocks (40), (41), (42), (43), (44), (45), (46), (47), (48), (49), (50), (51), (52), (53), (54), (55) and (56) of the invention herein can serve as a means of teach simple arithmetic; referring to FIG. 44, the appropriate square blocks (40), (41), (42), (43), (44), (45), (46), (47), (48), (49), (50), (51), (52), (53), (54), (55) and (56) can be arranged within the channels in the slanted layout panel (13) of the teaching tool (1) to display the arithmetical equation "19+20=39"; by first arranging the expression "19+20" in the invention herein, children can be encouraged to find the correct answer as an active teaching method.

Figure 45:
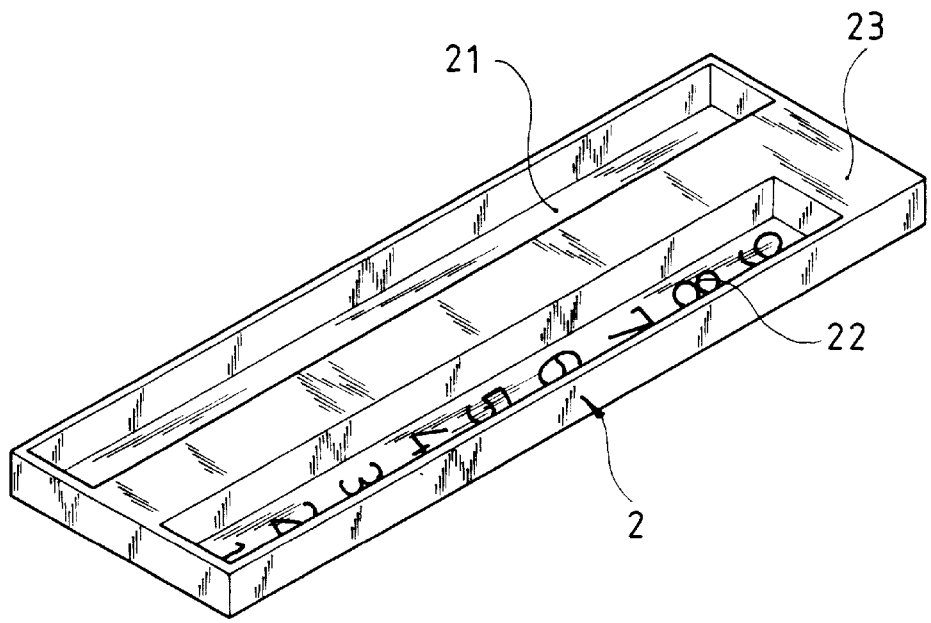
FIG. 45 is an isometric structural drawing of the layout box (2) of the invention herein.
Figure 46:
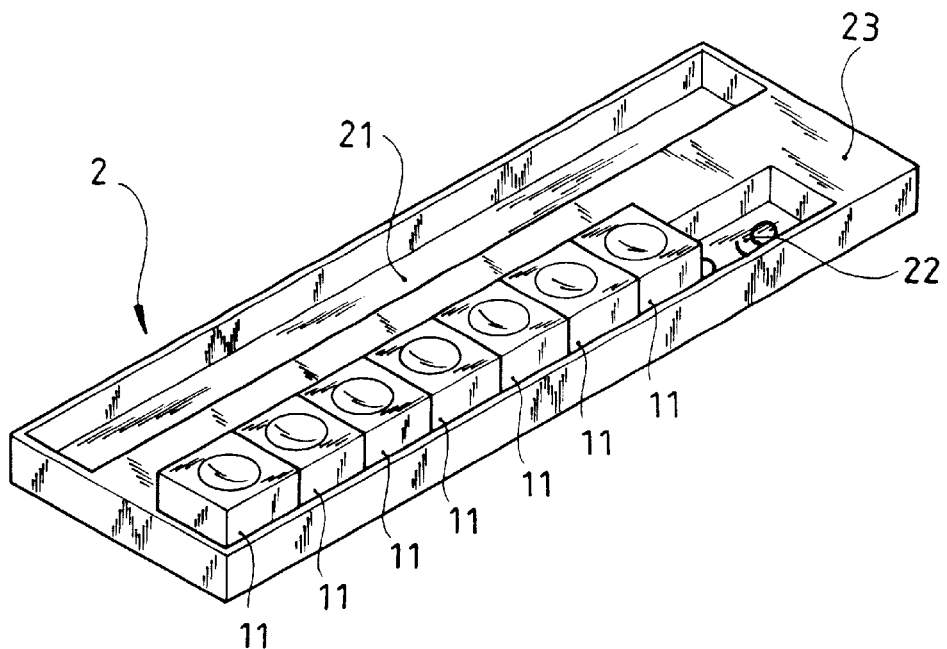
FIG. 46 is an isometric drawing of the embodiment of the layout box (2) of the invention herein.
Figure 47:
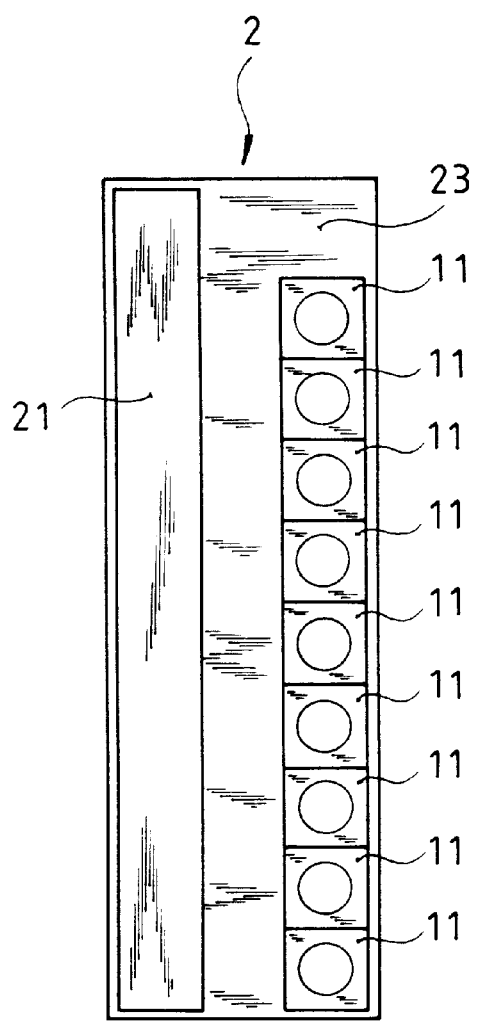
FIG. 47 is an orthographic drawing of the embodiment of the layout box (2) of the invention herein.
Figure 48:
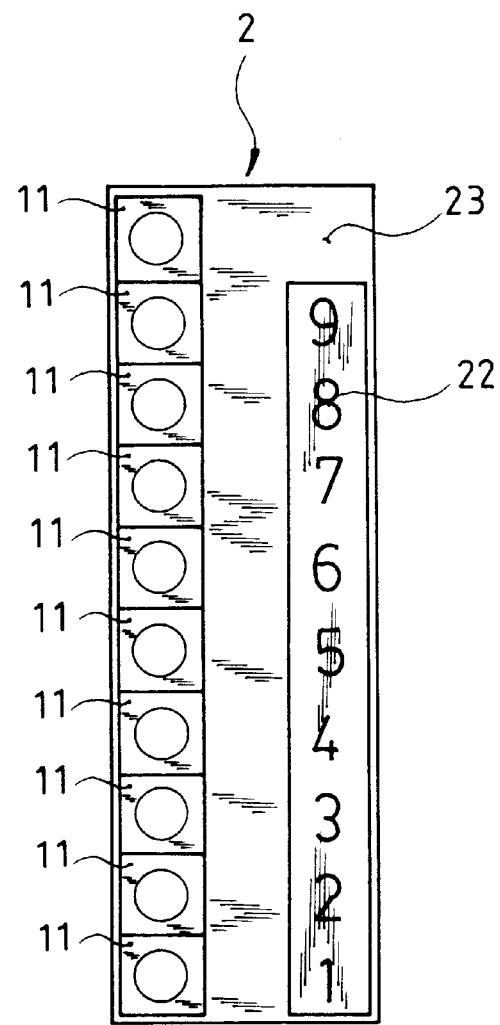
FIG. 48 is an orthographic drawing of another embodiment of the layout box (2) of the invention herein.

The invention herein includes a layout box (2) and, referring to FIG. 45, the aforesaid layout box (2) has a left channel (21) and a right channel (22); there is an elevated stop section (23) positioned at the upper end of the aforesaid right channel (22) and, furthermore, the numerals 1, 2, 3, 4, 5, 6, 7, 8 and 9 are printed from the top to the bottom inside the right channel (22), of which the channels of the aforesaid left channel (21) and right channel are only half the height of the square blocks (11) and, therefore, half the height of the square blocks project when arranged in the left channel (21) and the right channel (22), enabling easier removal and placement and, furthermore, the length, width and height dimensions of the square blocks (11) match the width of the left channel (21) and the right channel (22) to allow the square blocks (22) to be neatly and consecutively arrayed in a row within the left channel (21) and the right channel (22) and, as indicated in FIG. 46, the square blocks (11) are neatly and consecutively arrayed from the bottom to the top. Referring to the embodiments of the invention herein shown in FIG. 47 and FIG. 48, when the ninth square block (11) has been arrayed in the aforesaid neat and consecutive manner and the placement of a tenth square block (11) is desired, due to the extending stop block (23) positioned as the upper end of the right channel (22) of the layout box (2) of the invention herein, the number of arranged square blocks (11) is limited to nine and the entire row of square blocks (11) must be moved into the left channel (21) and, furthermore, ten square blocks (11) can be placed into the left channel (21); such a placement configuration causes the user to unconsciously develop the habit of carrying over to the left when the number of square blocks (11) reaches ten.

Figure 49:
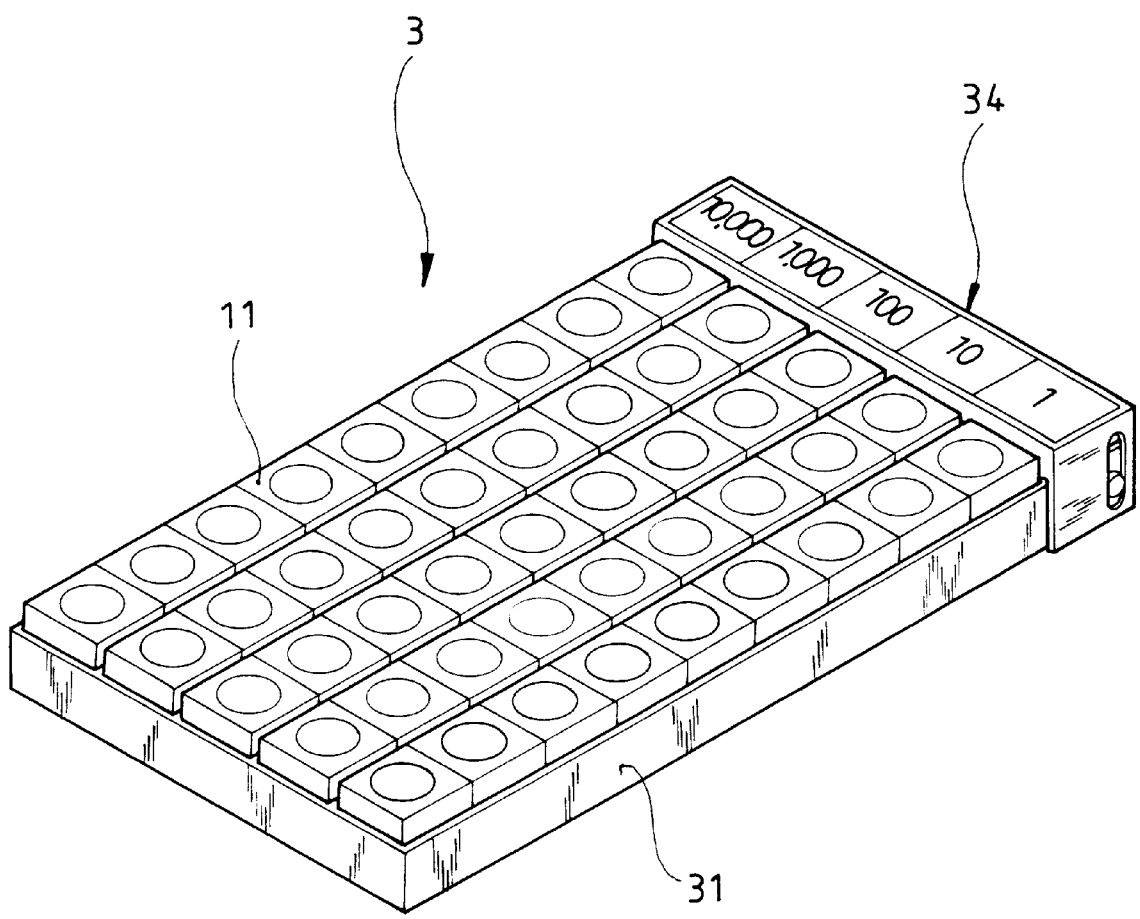
FIG. 49 is an isometric assembly drawing of the layout box (3) of the invention herein.
Figure 50:
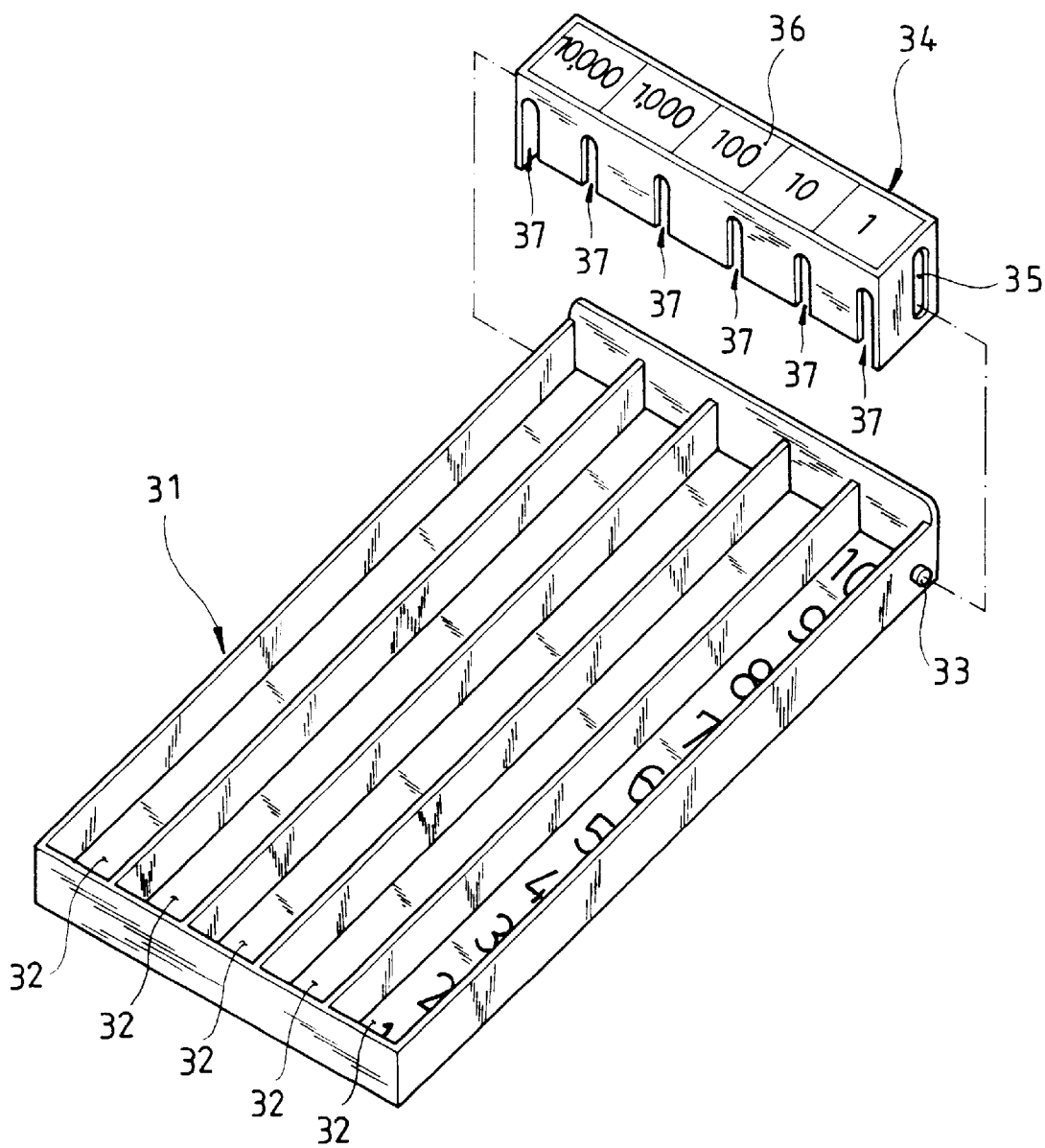
FIG. 50 is an exploded drawing of the layout box (3) of the invention herein.
Figure 51:
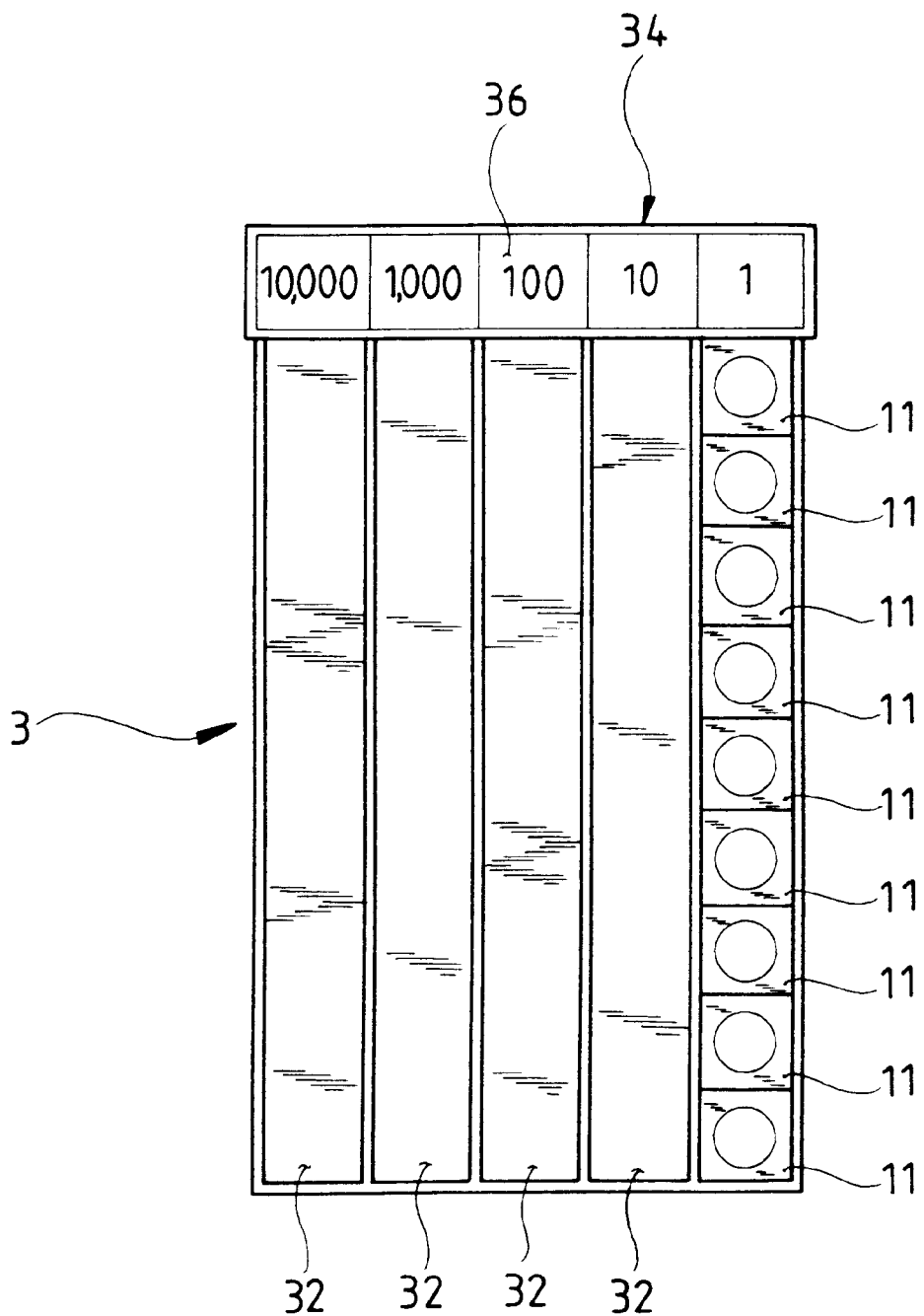
FIG. 51 is an orthographic drawing of the layout box (3) of the invention herein.
Figure 52:
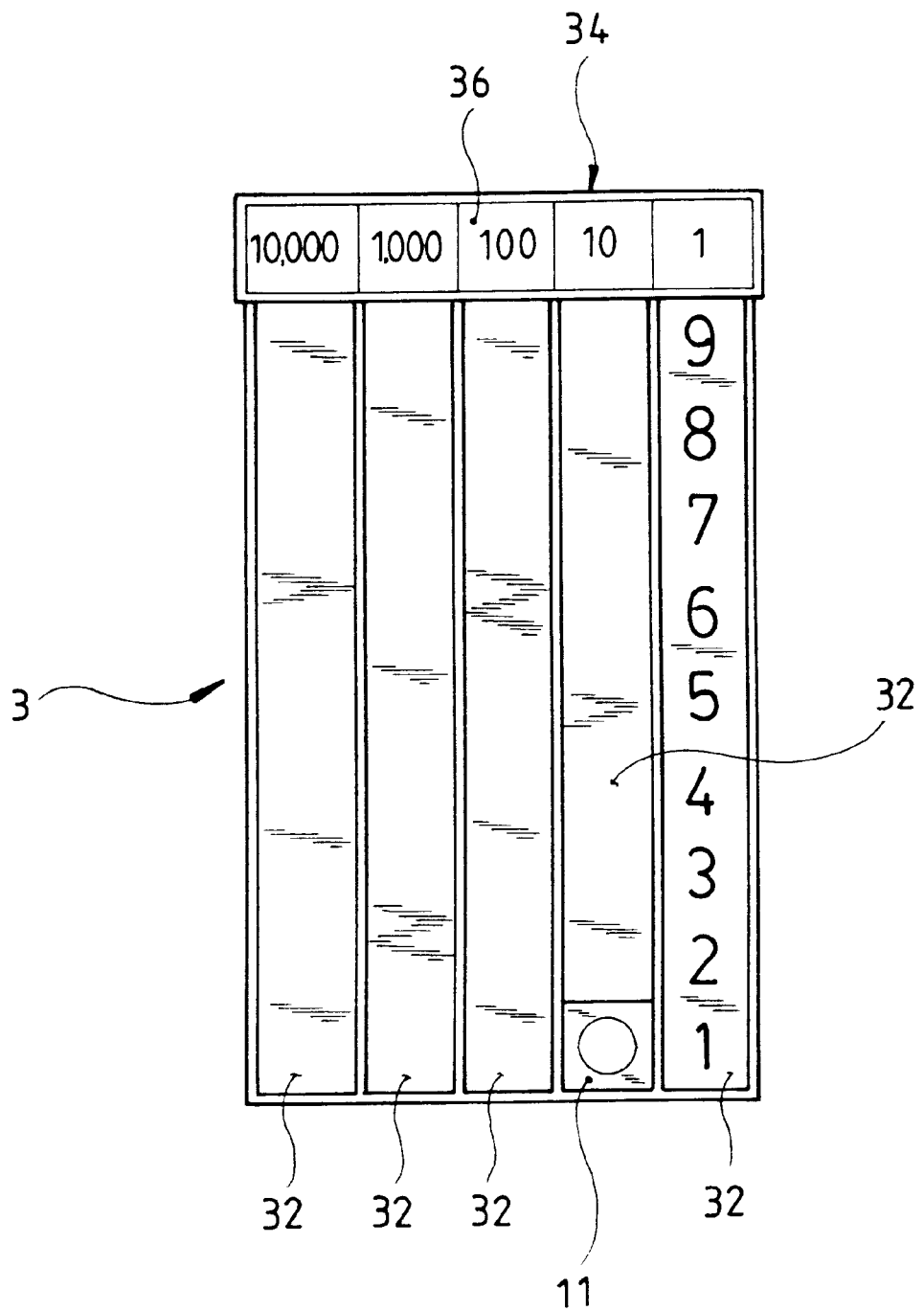
FIG. 52 is another orthographic drawing of the layout box (3) of the invention herein.

As indicated in FIG. 49 and FIG. 50, the invention herein also includes another layout box (3) and the aforesaid layout box (3) is comprised of a container box (31) and a stop cover (34), and there are five long rectangular recesses (32) inside the aforesaid container box (31) and, furthermore, the numerals 1, 2, 3, 4, 5, 6, 7, 8, 9 and 10 are printed from the bottom to the top in the long rectangular recess (32) at the extreme right, and there is a lock pin (33) on both the left and right sides of the upper end of the aforesaid container box (31); and a total of 50 square blocks (11) can be placed in the five recesses (32) of the aforesaid container box (31). The aforesaid stop cover (34) is a framework of extended length that has an elongated hole (35) on both the left and right side; furthermore, there are a number of open-ended slot holes (37) in the front side of the aforesaid stop cover (34) and attached to the upper extent of the stop cover (34) is a face plate (36), and printed on the colored square areas of the aforesaid face plate (36) are the numerals "1, 10, 100, 1,000" and "10,000." The lock pins (33) at the upper extent of both the left and right sides of the container box (31) and inserted into the elongated holes (35) in the both the left and right sides of the aforesaid stop cover (34) to enable the stop cover (34) to be swung upwards and downwards on the axis of the lock pins (33). Referring to FIG. 51 and FIG. 52, the orthographic drawings of the layout box (3), when the square blocks (11) are consecutively arrayed in a row from the bottom to the top within the recess (32) at the extreme right and the ninth square block (11) has been placed, to add a tenth square block (11), since the stop cover (34) at the upper end of the layout box (3) limits the number of placeable square blocks to nine, the aforesaid nine square blocks (11) must be moved into the recess (32) at the immediate left (the tens place in arithmetic), which is the procedure in arithmetic addition of the gradual movement or carrying over of sums from the ones place to the tens place and, subsequently, from the hundreds place to the thousands place and from the thousands place to the ten-thousands place.

In the channels of the slanted layout panel (13) of the teaching tool (1) invention herein, the arithmetic expression "19+20" can be displayed through the placement of the square blocks (40), (41), (42), (43), (44), (45), (46), (47), (48), (49), (50), (51), (52), (53), (54), (55) and (56), and then by the addition or subtraction of rows, serve as a simple arithmetical operations concept and since the number of square blocks (11) obtained corresponds to the successive arrangements of the square blocks (11) in the layout box (3), the correct answer is derived from the layout box (3), which in arithmetic would correspond to the equation "19+20=39"; the square blocks (40), (41), (42), (43), (44), (45), (46), (47), (48), (49), (50), (51), (52), (53), (54), (55) and (56) of the teaching tool (1) are designed such that the layout box (3) and the square blocks (11) can be utilized to perform simple arithmetic addition, subtraction, multiplication and division operations.

The alphanumeric characters printed on the six sides of the aforementioned square blocks (40), (41), (42), (43), (44), (45), (46), (47), (48), (49), (50), (51), (52), (53), (54), (55) and (56) and the rectangular blocks (57) and (58) of the teaching tool (1) invention herein can be arranged to the display the year, month, day, week, hours, minutes and seconds; furthermore, the coordinated utilization of the layout boxes (2) and (3) with the square blocks (11) can develop the concept of carrying over to the left as well as perform simple arithmetic addition, subtraction, multiplication and division operations.

In summation of the foregoing description, the invention herein can be utilized as a teaching tool (1) that is capable of various other functions, especially the teaching of daily life aspects in an interesting and effective manner; furthermore, since no product similar to the teaching tool of the invention herein has been observed on the market or in publications, the invention herein meets new patent application requirements and is hereby submitted in application thereof to the examination committee for the granting of the commensurate patent rights.

What is claimed is:

1. A teaching tool comprising a combination of date and time display means and a base 10 mathematical operation means, said combination comprises:

a base layout panel and a slanted payout panel, said slanted layout panel is attached to said base panel at a rearward angle, said slanted layout panel includes therein at least two recessed channels, said base layout panel includes therein at least two recessed base channels, a first recessed base channel has a rectangular cross section and a second recessed base channel has a triangular cross section, at least two layout boxes, a plurality of square blocks that are received in said layout panels and said recessed channels in said slanted layout panel and said recessed base channels, eight of said square blocks have alphanumeric characters comprising the digits 0 through 4 and a month of the year printed on sides of said eight square blocks, a second eight of said blocks have alphanumeric characters comprising the digits 5 through 9 and either a month of the year or a year, hour, minute, or second indicator printed on sides of said second eight square blocks, a first one of said square blocks includes mathematic operators printed on sides thereof, and at least two rectangular blocks, said rectangular blocks have days of the week printed on sides thereof; wherein a first one of said layout boxes comprises a first channel and a second channel, said first channel of said first layout box is adapted to hold ten of said square blocks, and said second channel of said first layout box is adapted to hold nine of said square blocks, said second channel of said first layout box is labelled with digits 1 through 9, a second one of said layout boxes comprises five rectangular recesses, each of said rectangular recesses is adapted to hold ten of said square blocks, a rightmost rectangular recess being labelled with the numerals 1 through 10, and a removable stop cover adapted to cover an uppermost section of said rectangular recesses, said section covered in each said rectangular recess corresponds to an are of one of said square blocks, said stop cover is labelled with the places of a base 10 numerical system, said stop cover is pivotally attached to said second layout box so that said stop cover pivots on and off of said upper area of said rectangular recesses; such that said square blocks with said alphanumeric characters and said rectangular blocks are arranged in said layout panels to display a date including year, month, and day, a day of the week, and time including hours, minutes, and seconds, and a user can utilize said square blocks in said layout boxes to gain familiarity with base 10 arithmetic operations.

* * * * *